(12) United States Patent
Terwillegar

(10) Patent No.: US 7,335,718 B2
(45) Date of Patent: Feb. 26, 2008

(54) POLYESTER OLIGOMERS

(75) Inventor: Matthew Terwillegar, Huntersville, NC (US)

(73) Assignee: DSM IP Assets B.V., Heerlen (NL)

( * ) Notice: Subject to any disclaimer, the term of this patent is extended or adjusted under 35 U.S.C. 154(b) by 0 days.

(21) Appl. No.: 11/783,160

(22) Filed: Apr. 6, 2007

(65) Prior Publication Data
US 2007/0185255 A1 Aug. 9, 2007

Related U.S. Application Data

(63) Continuation of application No. 10/736,986, filed on Dec. 17, 2003, now abandoned.

(60) Provisional application No. 60/434,413, filed on Dec. 19, 2002.

(51) Int. Cl.
*C08G 63/00* (2006.01)

(52) U.S. Cl. ................. 528/271; 427/385.5; 427/389.8; 427/487; 428/423.1; 524/507; 524/539; 524/589; 524/590; 525/123; 525/455; 528/272

(58) Field of Classification Search ............. 427/385.5, 427/389.8, 487; 428/423.1; 524/507, 539, 524/589, 590; 525/123, 455; 528/271, 272
See application file for complete search history.

(56) References Cited

U.S. PATENT DOCUMENTS 4,390,662 A * 6/1983 Ando et al. ................... 525/28

* cited by examiner

*Primary Examiner*—Terressa Boykin
(74) *Attorney, Agent, or Firm*—Nixon & Vanderhye P.C.

(57) ABSTRACT

The present invention provides oligomers having a backbone and one or more curable groups. The backbone comprises a polyester that is prepared from, inter alia, one or more polyalkylesters.

23 Claims, No Drawings

POLYESTER OLIGOMERS

CROSS REFERENCE TO RELATED APPLICATIONS

This application is a continuation of commonly owned U.S. application Ser. No. 10/736,986, filed on Dec. 17, 2003 now abandoned, which claims the benefit of U.S. provisional application No. 60/434,413 which was filed on Dec. 19, 2002, and which is hereby incorporated in its entirety by reference.

FIELD OF THE INVENTION

The present invention relates to polyester oligomers and to curable compositions comprising the same.

BACKGROUND

In the field of curable compositions, properties such as viscosity, hydrolytic stability, and mechanical properties are relevant parameters. These properties can be substantially influenced by including oligomeric components in the compositions. Providing a desirable combination of properties is cumbersome, however.

Curable compositions comprising polymers oligomers are mentioned in, for instance, U.S. Pat. No. 6,391,936 and WIPO Publication WO 02/55574, which are both hereby incorporated in their entirety by reference.

One of the objectives of the present invention is to provide polyester oligomers having low viscosity and good hydrolytic stability. Another objective of the present invention is to provide curable compositions exhibiting, after cure, a high modulus and good elongation to break.

SUMMARY OF THE INVENTION

The present invention provides polyester oligomers having a low viscosity. Also, the present invention provides polyester oligomers having good hydrolytic stability. Furthermore, the present invention provides curable compositions exhibiting, after cure, a high modulus and good elongation to break.

In one embodiment, the present invention provides oligomers comprising
  (1) a backbone comprising a polyester, said polyester being prepared by reacting:
    (a) one or more polyalkylesters; with
    (b) one or more polyols; and
  (2) one or more curable groups attached to said backbone;
  wherein said polyester has a number average molecular weight below 5,000 g/mol.

In another embodiment, the present invention provides a composition comprising:
  (i) a reactive diluent; and
  (ii) a polyester polyol having a number average molecular weight below 5,000 g/mol, said polyester polyol being prepared by reacting at least the following reactants:
    (a) one or more polyalkylesters;
    (b) one or more polyols;
    (c) optionally, one or more components selected from the group consisting of polycarboxylic acids, polycarboxylic anhydrides, and hydroxy-functional monocarboxylic acids.

DETAILED DESCRIPTION

The present polyester oligomers comprise a backbone and, in one embodiment, at least one curable group (e.g. at least two curable groups) attached to the backbone.

Preferably, the backbone is derived at least in part from a polyester polyol that is prepared by reacting at least the following reactants:
  (a) one or more polyalkylesters;
  (b) one or more polyols;
  (c) optionally, one or more components selected from the group consisting of polycarboxylic acids, polycarboxylic anhydrides, and hydroxy-functional monocarboxylic acids.

(a) Polyalkylesters as used herein refers to components comprising two or more alkyl ester groups. Alkyl ester groups as used herein refers to groups represented by the following formula (1):

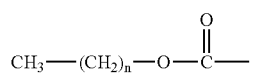

(1)

wherein n is an integer, preferably 0-4, for instance 0 or 1.

Polyalkylesters include alkyl ester derivatives of polycarboxylic acids, i.e. components corresponding to polycarboxylic acids except that the acid hydrogens of the carboxylic acid groups are instead alkyl groups. For instance, dimethyl terephthalate $[C_6H_4(COOCH_3)_2]$ can be the methyl ester derivative of terephthalic acid $[C_6H_4(COOH)_2]$.

Examples of alkyl ester derivatives of polycarboxylic acids include, for instance, alkyl ester derivatives of phthalic acid, alkyl ester derivatives of isophthalic acid, alkyl ester derivatives of terephthalic acid (e.g. dimethyl terephthalate), alkyl ester derivatives of maleic acid, alkyl ester derivatives of fumaric acid, alkyl ester derivatives of itaconic acid, alkyl ester derivatives of adipic acid, alkyl ester derivatives of glutaric acid, alkyl ester derivatives of azelaic acid, alkyl ester derivatives of sebacic acid, alkyl ester derivatives of citric acid, alkyl ester derivatives of trimellitic acid, alkyl ester derivatives of pyromellitic acid, alkyl ester derivatives of dodecane dicarboxylic acid, alkyl ester derivatives of dodecane dioic acid, alkyl ester derivatives of cyclohexane dicarboxylic acid, alkyl ester derivatives of methylene tetrahydrophthalic acid, and alkyl ester derivatives of succinic acid.

Employing polyalkylesters may allow for lower reaction temperatures for preparing the polyester and/or lower reaction times for preparing the polyester, which may improve, for instance, the color of the polyester. In addition, the use of polyalkylesters may provide polyesters with lower viscosities.

In one embodiment, at least 50 mole % (e.g. at least 75 mole %, at least 90 mole %, or about 100 mole %) of the one or more polyalkylesters comprise a cyclic group, for instance an aromatic ring. Employing cyclic structures may improve physical properties such as tensile strength, modulus, toughness, and/or hydrolytic stability.

(b) Examples of polyols include, for instance, 1,2-propanediol, 1,3-propanediol, 1,4-butanediol, 1,2-butanediol, 1,3-butanediol, 1,5-pentanediol, 1,6-hexanediol, 1,9-nonanediol, ethylene glycol, diethylene glycol, triethylene glycol, polyethylene glycol, dipropylene glycol, glycerol, trimethylol ethane, trimethylol propane, neopentyl glycol, pentaerythritol, dipentaerythritol, sorbitol, 2-methyl-1,3-propane diol, 2,2-dimethyl-1,3-propanediol, 2-ethyl-1,3-propanediol, 2,2-diethyl-1,3-propanediol, 2-propyl-2-methyl-1,3-propanediol, 2-propyl-2-ethyl-1,3-propanediol, 2-butyl-2-ethyl-1,3-propanediol (BEPD), hydroxy pivaloyl hydroxy pivalate (HPHP), 2-cyclohexyl-2-methyl-1,3-propanediol, 2-phenyl-2-methyl-1,3-propanediol, 1,4-cyclohexanediol, and 2,4-diethyl-1,5-pentane diol. Preferred are $C_1$-$C_8$ polyols, e.g. $C_1$-$C_8$ diols or $C_1$-$C_4$ diols, for instance diethylene glycol, 1,2-propane diol, and 1,3-propane diol.

(c) Optionally, the reagents may include polycarboxylic acids, polycarboxylic acid anhydrides, and/or hydroxyfunctional monocarboxylic acids. Examples of polycarboxylic acids include, for instance, phthalic acid, isophthalic acid, terephthalic acid, maleic acid, fumaric acid, itaconic acid, adipic acid, glutaric acid, azelaic acid, sebacic acid, citric acid, trimellitic acid, pyromellitic acid, dodecane dicarboxylic acid, dodecane dioic acid, cyclohexane dicarboxylic acid, methylene tetrahydrophthalic acid, dimer fatty acids, and succinic acid. Examples of polycarboxylic anhydrides include, for instance, phthalic anhydride, maleic anhydride, itaconic anhydride, trimellitic anhydride, pyromellitic dianhydride, tetrahydrophthalic acid anhydride, methylene tetrahydrophthalic anhydride, and hexahydrophthalic acid anhydride. Examples of hydroxyfunctional monocarboxylic acids include, for instance, 12-hydroxystearic acid, 2-hydroxy-4-methyl valeric acid, 12-hydroxy-4-octyl-dodecanoic acid, δ-dodecanolactone, 19-hydroxy-10-hexyl-nonadecanoic acid, and 16-hydroxy-4-nonyl-11-butyl-hexadecanoic acid.

Preferably, the reactants to form the polyester polyol include at least 50 wt % (relative to the combined weight of polycarboxylic acids, polycarboxylic acid anhydrides, hydroxy-functional monocarboxylic acids, and polyalkylesters) of one or more polyalkylesters, for instance at least 75 wt %, at least 90 wt %, or about 100 wt %.

The number average molecular weight of the polyester polyol is preferably below 5,000 g/mol, for instance below 3,000 g/mol, below 2000 g/mol, below 1500 g/mol, or below 1250 g/mol. The number average molecular weight of the polyester polyol is preferably at least 500 g/mol, for instance at least 750 g/mol.

In one embodiment, the viscosity of the polyester polyol is such that the viscosity of a 3:1 (wt/wt) mixture of the polyester polyol with ethoxylated (4) nonylphenol acrylate is below 50,000 cPs at 25° C., for instance below 45,000 cPs, below 40,000 cPs, or below 35,000 cPs.

At 60° C., the viscosity of the mixture is preferably below 2500 cPs, for instance below 2,000 cPs, below 1600 cPs, or below 1400 cPs. The viscosity of the mixture at 25° C. is generally at least 5,000 cPs and at 60° C. generally at least 500 cPs.

In one embodiment, the present polyester polyols exhibit a hydrolytic stability, as expressed in acid number rise of the polyester polyol after exposure to water at elevated temperatures (see infra Examples and Test Methods), of less than 3.0, for instance less than 2.7, less than 2.4, or less than 2.2.

The oligomer backbone may be derived from components in addition to the above polyester polyol, for instance polyether polyols, polycarbonate polyols, or further polyesters. These components may be linked to the polyester polyol in any suitable manner. For instance, the polyester polyol may be linked to other polyols with the aid of polyisocyanates (therewith linking the polyols via urethane groups).

Examples of polyether polyols include, for instance, polyethylene glycol, polypropylene glycol, polypropylene glycol-ethyleneglycol copolymer, polytetramethylene glycol, polyhexamethylene glycol, polyheptamethylene glycol, polydecamethylene glycol, and polyether diols obtained by ring-opening copolymerization of two or more ion-polymerizable cyclic compounds (e.g. ethylene oxide, isobutene oxide, tetrahydrofuran, 2-methyltetrahydrofuran, 3-methyltetrahydrofuran, phenyl glycidyl ether, or butyl glycidyl ether). Commercial examples of further polyesters include those commercially available under the trademarks MPD/IPA500, MPD/IPA1000, MPD/IPA2000, MPD/TPA500, MPD/TPA1000, MPD/TPA2000, Kurapol A-1010, A-2010, PNA-2000, PNOA-1010, and PNOA-2010 (manufactured by Kuraray Co., Ltd.). Commercially available products of polycarbonate polyols include DN-980, DN-981 (manufactured by Nippon PolyUrethane Industry Co., Ltd.), Priplast 3196, 3190, 2033 (manufactured by Unichema), PNOC-2000, PNOC-1000 (manufactured by Kuraray Co., Ltd.), PLACCEL CD220, CD210, CD208, CD205 (manufactured by Daicel Chemical Industries, Ltd.), and PC-THF-CD (manufactured by BASF).

A curable group may be attached to the oligomer backbone in any suitable manner. Examples of curable groups include, for instance, ethylenically unsaturated groups and epoxy groups. Examples of ethylenically unsaturated groups include, for instance, acrylate groups and methacrylate groups (collectively referred to as "(meth)acrylate groups"), and vinyl ether groups. Examples of epoxy groups include, for instance, groups comprising an oxirane ring structure or an oxetane ring structure.

Oxirane groups may be introduced, for instance, by reacting hydroxy groups in the oligomer backbone with epichlorohydrin. (Meth)acrylate groups may be introduced, for instance, by reacting the backbone hydroxy group(s) with one or more alpha-beta unsaturated carboxylic acids, for instance acrylic acid or methacrylic acid. Also, (meth)acrylate groups may be attached to the backbone via a linking group, such as a urethane group. For instance, the hydroxy group(s) of the backbone may be reacted with a polyisocyanate (e.g. a diisocyanate) to provide an isocyanate-functional urethane backbone, and the isocyanate-functionality may subsequently be reacted with a hydroxyfunctional (meth)acrylate to provide a urethane (meth)acrylate oligomer.

Examples of polyisocyanates include, for instance, 2,4-tolylene diisocyanate, 2,6-tolylene diisocyanate, 1,3-xylylene diisocyanate, 1,4-xylylene diisocyanate, 1,5-naphthalene diisocyanate, p-phenylene diisocyanate, 3,3'-dimethyl-4,4'-diphenylmethane diisocyanate, 4,4'-diphenylmethane diisocyanate, 3,3'-dimethylphenylene diisocyanate, 4,4'-biphenylene diisocyanate, hexamethylene diisocyanate, isophorone diisocyanate, dicyclohexyl methane diisocyanate, methylenebis(4-cyclohexylisocyanate), hydrogenated diphenylmethane diisocyanate, 2,2,4-trimethylhexamethylene diisocyanate, bis(2-isocyanateethyl)fumarate, 6-isopropyl-1,3-phenyl diisocyanate, 4-diphenylpropane diisocyanate, lysine diisocyanate, and the like. In one embodiment, the polyisocyanate comprises an aromatic ring.

Examples of hydroxy-functional (meth)acrylates include, for instance, hydroxyfunctional alkyl(meth)acrylates (e.g. 2-hydroxyethyl(meth)acrylate, 2-hydroxypropyl(meth)acrylate, and 2-hydroxyoctyl(meth)acrylate), pentaerythritoltri(meth)acrylate, glyceroldi(meth)acrylate, dipentaerythritolmonohydroxypenta(meth)acrylate, 1,4-butanediolnono(meth)acrylate, 4-hydroxycyclohexyl(meth)acrylate, 1,6-hexanediolnono(meth)acrylate, neopentylglycolmono (meth)acrylate, trimethylolpropanedi(meth)acrylate, and trimethylolethanedi(meth)acrylate.

Applications

The present polyester oligomers are useful in a wide variety of applications, for instance as ingredients in compositions that can be cured by, e.g., actinic radiation (e.g. ultraviolet radiation), electron beam radiation, and/or heat. In one embodiment, the compositions are useful in rapid prototyping processes to make three-dimensional objects. If the compositions are employed as rapid prototyping compositions, the compositions will typically be hybrid compositions, i.e. comprise both free radical curable components (e.g. acrylate or methacrylate components) and cationically curable components (e.g. epoxy-functional components). Rapid prototyping involves the successive, imagewise curing of (thin) layers of a composition to build up a three dimensional object. See, e.g., U.S. Pat. No. 5,972,563, which is hereby incorporated in its entirety by reference.

Furthermore, the present polyester oligomers are, for instance, useful in compositions for coating substrates, e.g. wood, glass, metal, ceramic, or plastic substrates. In one embodiment, the compositions are useful for coating or binding optical fibers. In the production of optical fibers, a resin coating is applied onto the fibers for protection and reinforcement. Generally, at least two coatings are applied: a soft primary coating layer of a flexible resin (low modulus and low Tg) which is coated directly on the (glass) surface, and a secondary coating layer of a rigid resin (higher modulus and higher Tg) which is provided over the primary coating layer. Often, for identification purposes, the fibers will be further coated with an ink, which is a curable resin comprising a colorant (such as a pigment and/or a dye), or the secondary coating may be a colored secondary coating (i.e, comprise a colorant). Also, several coated optical fibers can be bundled together to form a so-called optical fiber ribbon, e.g., four or eight coated optical fibers are arranged on a plane and secured with a binder to produce a ribbon structure having a rectangular cross section. Said binder material for binding several optical fibers to produce the optical fiber ribbon structure is often referred to as a matrix material. In addition, a material for the further binding of several optical fiber ribbons to produce multi-core optical fiber ribbons is often referred to as a bundling material.

In one embodiment, the present compositions comprise, relative to the total weight of the composition, at least 10 wt % of the present polyester oligomer, e.g. at least 20 wt % or at least 30 wt %. In one embodiment, the compositions comprise less than 90 wt % of present polyester oligomer, e.g. less than 75 wt % or less than 60 wt %.

The present compositions may, in addition to one or more of the present polyester oligomers, comprise a wide variety of ingredients, for instance further oligomers, reactive diluents, free radical photoinitiators, cationic photoinitiators, and additives.

Further oligomers include, for instance, polyethers, polyesters, polycarbonates, polyacrylates, and copolymers thereof. The further oligomers may comprise one or more (e.g. two or more) hydroxy groups, comprise one or more (e.g. two or more) ethylenically unsaturated groups, and/or comprise one or more (e.g. two or more) epoxy groups. In one embodiment, the present compositions comprise, relative to the total weight of the composition, 0-60 wt % of further oligomers, e.g. 5-40 wt %.

Examples of reactive diluents include monofunctional monomers and polyfunctional monomers. Examples of monofunctional monomers include monomers containing a vinyl group, such as N-vinyl pyrrolidone, N-vinyl caprolactam, vinyl imidazole, vinyl pyridine; isobornyl(meth)acrylate, bornyl(meth)acrylate, tricyclodecanyl(meth)acrylate, dicyclopentanyl(meth)acrylate, dicyclopentenyl(meth)acrylate, cyclohexyl(meth)acrylate, benzyl(meth)acrylate, 4-butylcyclohexyl(meth)acrylate, acryloyl morpholine, 2-hydroxyethyl(meth)acrylate, 2-hydroxypropyl(meth)acrylate, 2-hydroxybutyl (meth)acrylate, methyl(meth)acrylate, ethyl (meth)acrylate, propyl(meth)acrylate, isopropyl (meth)acrylate, butyl(meth)acrylate, amyl(meth)acrylate, isobutyl (meth)acrylate, t-butyl (meth)acrylate, pentyl(meth)acrylate, caprolactone acrylate, isoamyl(meth)acrylate, hexyl (meth) acrylate, heptyl(meth)acrylate, octyl(meth)acrylate, isooctyl (meth)acrylate, 2-ethylhexyl(meth)acrylate, nonyl(meth) acrylate, decyl(meth)acrylate, isodecyl (meth)acrylate, undecyl(meth)acrylate, dodecyl(meth)acrylate, lauryl(meth) acrylate, stearyl (meth)acrylate, isostearyl(meth)acrylate, tetrahydrofurfuryl(meth)acrylate, butoxyethyl (meth)acrylate, ethoxydiethylene glycol (meth)acrylate, benzyl(meth) acrylate, phenoxyethyl (meth)acrylate, polyethylene glycol mono(meth)acrylate, polypropylene glycol mono(meth) acrylate, methoxyethylene glycol (meth)acrylate, ethoxyethyl(meth)acrylate, methoxypolyethylene glycol (meth)acrylate, methoxypolypropylene glycol (meth)acrylate, diacetone (meth)acrylamide, isobutoxymethyl(meth)acrylamide, N,N-dimethyl (meth)acrylamide, t-octyl(meth)acrylamide, dimethylaminoethyl(meth)acrylate, diethylaminoethyl(meth)acrylate, 7-amino-3,7-dimethyloctyl(meth)acrylate, N,N-diethyl (meth)acrylamide, N,N-dimethylaminopropyl (meth)acrylamide, hydroxybutyl vinyl ether, lauryl vinyl ether, cetyl vinyl ether, 2-ethylhexyl vinyl ether; and compounds represented by the following formula (2)

$$CH_2=C(R^6)-COO(R^7O)_m-R^8 \quad (2)$$

wherein $R^6$ is a hydrogen atom or a methyl group; $R^7$ is an alkylene group containing 2 to 8, preferably 2 to 5 carbon atoms; and m is an integer from 0 to 12, and preferably from 1 to 8; $R^8$ is a hydrogen atom or an alkyl group containing 1 to 12, preferably 1 to 9, carbon atoms; or, $R^8$ is a tetrahydrofuran group comprising alkyl group with 4-20 carbon atoms, optionally substituted with alkyl groups with 1-2 carbon atoms; or $R^8$ is a dioxane group-comprising alkyl group with 4-20 carbon atoms, optionally substituted with methyl groups; or $R^8$ is an aromatic group, optionally substituted with $C_1$-$C_{12}$ alkyl group, preferably a $C_8$-$C_9$ alkyl group, and alkoxylated aliphatic monofunctional monomers, such as ethoxylated isodecyl (meth)acrylate, ethoxylated lauryl(meth)acrylate, and the like.

Examples of polyfunctional monomers include monomers containing two or more (meth)acrylate groups such as trimethylolpropane tri(meth)acrylate, pentaerythritol (meth) acrylate, ethylene glycol di(meth)acrylate, tetraethylene glycol di(meth)acrylate, polyethylene glycol di(meth)acrylate, 1,4-butanediol di(meth)acrylate, 1,6-hexanediol di(meth) acrylate, neopentyl glycol di(meth)acrylate, trimethylolpropanetrioxyethyl (meth)acrylate, tris(2-hydroxyethyl)isocyanurate tri(meth)acrylate, tris(2-hydroxyethyl)isocyanurate di(meth)acrylate, tricyclodecane diyl dimethyl di(meth) acrylate, and di(meth)acrylate of a diol which is an ethylene oxide or propylene oxide adduct to bisphenol A, di(meth) acrylate of a diol which is an ethylene oxide or propylene oxide adduct to hydrogenated bisphenol A, epoxy(meth) acrylate which is a (meth)acrylate adduct to bisphenol A of diglycidyl ether, diacrylate of polyoxyalkylated bisphenol A, and triethylene glycol divinyl ether, adduct of hydroxyethyl acrylate, isophorone diisocyanate and hydroxyethyl acrylate (HIH), adduct of hydroxyethyl acrylate, toluene diisocyanate and hydroxyethyl acrylate (HTH), and amide ester acrylate.

In one embodiment, the compositions comprise, relative to the total weight of the composition, at least 10 wt % of one or more reactive diluents, e.g. at least 20 wt % or at least 30 wt %. The compositions generally comprise less than 90 wt % of one or more reactive diluents, e.g. less than 75 wt % or less than 50 wt %.

Examples of free radical photo initiators include benzophenones (e.g. benzophenone, alkyl-substituted benzophenone, or alkoxy-substituted benzophenone); benzoins, e.g. benzoin, benzoin ethers, such as benzoin methyl ether, benzoin ethyl ether, and benzoin isopropyl ether, benzoin phenyl ether, and benzoin acetate; acetophenones, such as acetophenone, 2,2-dimethoxyacetophenone, 4-(phenylthio) acetophenone, and 1,1-dichloroacetophenone; benzil, benzil ketals, such as benzil dimethyl ketal, and benzil diethyl ketal; anthraquinones, such as 2-methylanthraquinone, 2-ethylanthraquinone, 2-tertbutylanthraquinone, 1-chloroanthraquinone, and 2-amylanthraquinone; triphenylphosphine; benzoylphosphine oxides, such as, for example, 2,4, 6-trimethylbenzoyldiphenylphosphine oxide; thioxanthones and xanthones, acridine derivatives, phenazene derivatives, quinoxaline derivatives or 1-phenyl-1,2-propanedione-2-O-benzoyloxime, 1-aminophenyl ketones or 1-hydroxyphenyl ketones, such as 1-hydroxycyclohexyl phenyl ketone, phenyl (1-hydroxyisopropyl)ketone and 4-isopropylphenyl(1-hydroxyisopropyl)ketone, or triazine compounds, for example, 4'''-methyl thiophenyl-1-di(trichloromethyl)-3,5-S-triazine, S-triazine-2-(stilbene)-4,6-bistrichloromethyl, and paramethoxy styryl triazine. Free radical photoinitiators are particularly useful if the composition comprises ethylenically unsaturated components, for instance acrylates or methacrylates. In one embodiment, the compositions comprise, relative to the total weight of the composition, 0-10 wt % of one or more free radical photoinitiators, e.g. 0.5-7.5 wt %.

Examples of cationic photoinitiators include, for instance, onium salts with anions of weak nucleophilicity. Examples include halonium salts, iodosyl salts or sulfonium salts, such as are described in published European patent application EP 153904 and WO 98/28663, sulfoxonium salts, such as described, for example, in published European patent applications EP 35969, 44274, 54509, and 164314, or diazonium salts, such as described, for example, in U.S. Pat. Nos. 3,708,296 and 5,002,856. All eight of these disclosures are hereby incorporated in their entirety by reference. In one embodiment, the present compositions comprise one or more photoinitiators represented by the following formula (3) or (4):

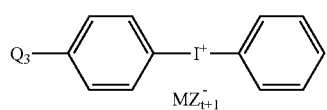

(3)

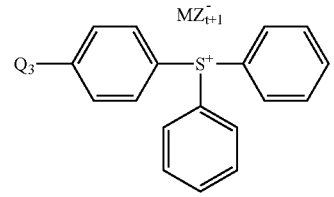

(4)

wherein $Q_3$ represents a hydrogen atom, an alkyl group having 1 to 18 carbon atoms, or an alkoxyl group having 1 to 18 carbon atoms;

M represents a metal atom, e.g. antimony;

Z represents a halogen atom, e.g. fluorine; and t is the valent number of the metal, e.g. 5 in the case of antimony.

Cationic photoinitiators are particularly useful if the compositions comprise components having oxirane and/or oxetane rings. Also, cationic photoinitiators may be useful when the compositions comprise vinyl ethers (e.g. diethyleneglycol divinyl ether). In one embodiment, the compositions comprise, relative to the total weight of the composition, 0-10 wt % of one or more cationic photoinitiators, e.g. 0.5-7.5 wt %.

Additives may also be present in the composition of the invention. Examples of additives include antioxidants, dyes, wetting agents, antifoaming agents, thickening agents, photosensitizers, solvents (preferably in amounts less than 20 wt %, e.g. less than 10 wt %, less than 5 wt %, or about 0 wt %), and metallic-, organic-, inorganic-, or organic/inorganic hybrid fillers (e.g. silica particles, glass beads, or talc). The size of the fillers may vary and can be, for instance, in the nanometer range or in the micrometer range. In one embodiment, the present compositions comprise, relative to the total weight of the composition, less than 20 wt % of fillers, e.g. less than 10 wt %, less than 5 wt %, or about 0 wt %.

In one embodiment, the present compositions, after cure, exhibit a tensile modulus of at least 500 MPa at 23° C., for instance at least 750 MPa, at least 1000 MPa, or at least 1200 MPa. The tensile modulus is generally below 2500 MPa at 23° C.

In one embodiment, the present compositions, after cure, have an elongation to break of at least 10% at 23° C., for instance at least 20%, at least 30%, or at least 40%. The elongation to break is generally below 250% at 23° C.

In one embodiment, the present compositions, after cure, exhibit a tensile strength of at least 10 MPa at 23° C., for instance at least 20 MPa, at least 30 MPa, or at least 40 MPa. The tensile modulus is generally below 150 MPa at 23° C.

In one embodiment, the present compositions, after cure, exhibit a glass transition temperature (Tg) of at least 35° C., for instance at least 50° C., at least 75° C., or at least 100° C. The glass transition temperature will generally be below 250° C.

In one embodiment, the present compositions, after cure, exhibit a toughness of at least 5 J/cm$^3$ at 23° C., for instance at least 10 J/cm$^3$, or at least 15 J/cm$^3$. The toughness is generally below 100 J/cm$^3$ at 23° C.

EXAMPLES

The following examples are given as particular embodiments of the invention and to demonstrate the practice and advantages thereof. It is to be understood that the examples are given by way of illustration and are not intended to limit the specification or the claims that follow in any manner.

TABLE 1

Glossary

| Abbreviation | Description |
|---|---|
| DMT | Dimethyl terephthalate |
| PA | Phthalic anhydride |
| TPA | Terephthalic acid |
| IPA | Isophthalic acid |
| DEG | Diethylene glycol |
| PG | Propylene glycol |
| MPD | 2-methyl-1,3-propanediol |
| DPDP | Diphenyl isodecyl phosphite (Doverphos 8, available from Dover Chemical Company, Inc.) |
| F-4100 | Butylstannoic acid (Fascat 4100, available from AtoFina, Ltd.) |
| TPT | Tetra isopropyl titanate (Tyzor TPT, aviable from Dupont Chemicals, Inc.) |
| ENPA | Ethoxylated (4) nonylphenol acrylate (SR-504, available from Sartomer, Inc.) |
| CPI 6976 | Mixture of hexafluoroantimonate sulfonium salts (Aceto Corp.) |
| DVE-2 | Diethylene glycol divinyl ether |
| Irganox 1035 | Antioxidant (Ciba Geigy) |
| Irgacure 184 | 1-hydroxycyclohexyl phenyl ketone (Ciba Geigy) |
| TPO | 2,4,6-trimethylbenzoyldiphenyl-phosphine oxide (BASF AG) |
| SR-349 | Ethoxylated (3) bisphenol A diacrylate (Sartomer) |

Examples 1-4

Preparation of Polyester Polyol

Synthesis of polyester polyols for examples 1-4 followed the following procedure (for the amounts in which the various components were used, please see Table 2 below):

The reactants were charged to a reaction flask, F-4100 was added, and a nitrogen sparge and heat were introduced. Once the mixture melted, gentle agitation was initiated, and a small aliquot of phosphite antioxidant was added. The reaction flask temperature was maintained at 210° C., and methanol condensate (when DMT was used) or water condensate (when a polycarboxylic acid was used) was collected by controlling the vapor exit from the flask at around 55-75° C. for methanol and 80-100° C. for water.

After the column exit vapor temperature fell below 50° C. (80° C. for water), the hydroxyl number of the mixture was monitored. The reaction was allowed to continue until the final hydroxyl number reached 100-115, at which point the obtained polyester polyol was cooled to 100° C. and rapidly charged into an amount of ENPA, such that the weight ratio of polyester polyol to ENPA was 3:1. The mixture was then allowed to cool down under agitation.

TABLE 2

| | Ex 1 | Ex 2 | Ex 3 | Ex 4 |
|---|---|---|---|---|
| Ingredients | | | | |
| DMT (mol) | 100.0 | — | — | — |
| PA (mol) | — | 100.0 | — | — |
| TPA (mol) | — | — | 100.0 | — |
| IPA (mol) | — | — | — | 100.0 |
| DEG (mol) | 106.9 | 106.9 | 106.9 | 106.9 |
| PG (mol) | 18.9 | 18.9 | 18.9 | 18.9 |
| DPDP (wt %) | 0.2 | 0.2 | 0.2 | 0.2 |
| F-4100 (ppm) | 50 | 50 | 50 | 50 |
| TPT (ppm) | 50 | 50 | 50 | 50 |
| ENPA (wt %) | 25 | 25 | 25 | 25 |
| Properties | | | | |
| acid number of the polyester polyol | 0.70 | 4.94 | 2.17 | 3.27 |
| hydrolytic stability of the polyester polyol (acid number rise) | 2.05 | 3.21 | 1.19 | 2.38 |
| hydroxyl number of the polyester polyol | 107.8 | 108.9 | 107.2 | 108.8 |
| number average molecular weight ($M_n$) of the polyester polyol (g/mol) | 1089 | 1092 | 1310 | 1281 |
| weight average molecular weight ($M_w$) of the polyester polyol (g/mol) | 1819 | 1711 | 2276 | 2158 |
| polydispersity | 1.7 | 1.6 | 1.7 | 1.7 |
| reaction time, hours | 15.5 | 28.5 | 42.0 | 18.5 |
| viscosity @ 25° C., cPs | 30,000 | 41,000 | 61,000 | 109,000 |
| viscosity @ 60° C., cPs | 1200 | 1260 | 4240 | 2800 |

Examples 5-8

Preparation of Oligomer

After each completed polyester polyol was evaluated, urethane acrylate oligomers were synthesized by reacting each respective polyester polyol (in the 25 wt % ENPA) with toluene diisocyanate and hydroxyethyl acrylate in the amounts indicated in Table 3. First, HEA and TDI were reacted in the presence of the bismuth catalyst (about 100 ppm) and the BHT antioxidant (about 800 ppm) in a reaction flask under a dry air sparge. Care was taken that the temperature in the reaction flask did not exceed 60° C. After this reaction, the reaction flask temperature was held at 40° C. and the polyester polyol/ENPA blend was added. The thus obtained mixture was then allowed to react at a temperature of 95° C. until the isocyanate value of the reaction mixture dropped below 0.10%.

TABLE 3

| Ingredients | Ex 5 | Ex 6 | Ex. 7 | Ex. 8 |
|---|---|---|---|---|
| Polyester polyol of Ex. 1 (DMT) (grams) | 58.8 | — | — | — |
| Polyester polyol of Ex. 2 (PA) (grams) | — | 58.4 | — | — |
| Polyester polyol of Ex. 3 (TPA) (grams) | — | — | 60.2 | — |
| Polyester polyol of Ex. 4 (TPA) (grams) | — | — | — | 59.5 |
| TDI (grams) | 14.7 | 14.9 | 15.0 | 15.1 |
| Bismuth octoate | <.1 | <.1 | <.1 | <.1 |
| BHT (grams) | <.1 | <.1 | <.1 | <.1 |
| 2-HEA (grams) | 9.7 | 9.9 | 9.9 | 10.0 |

Examples 9-10

Preparation of Curable Composition

Urethane acrylate oligomers of Examples 5 and 6 (as diluted in the ENPA) were then mixed with ingredients as indicated in Table 4. The physical properties of the thus obtained compositions are also listed.

TABLE 4

|  | Ex 9 (wt. %) | Ex 10 (wt. %) |
| --- | --- | --- |
| Ingredients |  |  |
| Urethane Acrylate Oligomer Ex. 5 | 83.2 | — |
| Urethane Acrylate Oligomer Ex. 6 | — | 83.2 |
| SR-349 | 15.0 | 15.0 |
| TPO | 0.5 | 0.5 |
| Irganox 1035 | 0.3 | 0.3 |
| Irgacure 184 | 1.0 | 1.0 |
| Properties |  |  |
| Tensile Strength* (MPa) | 48.3 | 56.2 |
| Elongation* (%) | 47.9 | 74.9 |
| Modulus* (MPa) | 1237 | 867 |
| Toughness* (J/cm$^3$) | 18.1 | 26.6 |
| Viscosity** @ 60° C. (cPs) | 16,500 | 17,000 |

*Determined after cure.
**Determined after adding the SR-349 but before adding the TPO, Irganox 1035, and Irgacure 184.

Examples 11-13

Preparation of a Polyester Polyol, a Polyester Urethane Acrylate, and a Curable Composition A polyester polyol was produced in the same manner as for examples 1-4, except that the ingredients listed in Table 5 were used:

TABLE 5

|  | Ex 11 |
| --- | --- |
| Ingredients |  |
| DMT (mol) | 100.0 |
| DEG (mol) | 62.7 |
| MPD (mol) | 62.7 |
| DPDP (wt %) | 0.2 |
| F-4100 (ppm) | 75 |
| DVE-2 (wt %) | 25 |
| Properties |  |
| Hydroxyl value | 102.4 |

A urethane acrylate oligomer was prepared in the same manner as for Examples 5-6, except that the polyester polyol of Ex. 11 (diluted with the DVE-2) and the amounts listed in Table 6 were used.

TABLE 6

|  | Ex 12 |
| --- | --- |
| Polyester polyol of Ex. 11 (grams) | 122.3 |
| TDI (grams) | 29.4 |
| Bismuth octoate (grams) | <.1 |
| BHT (grams) | <.1 |
| 2-HEA (grams) | 19.5 |

The urethane acrylate oligomer of example 12 (as diluted in the DVE-2) was then mixed with ingredients as indicated in Table 7. The physical properties of the thus obtained composition, when cured, are also listed.

TABLE 7

|  | Ex. 13 |
| --- | --- |
| Urethane acrylate oligomer of Ex. 12 (grams) | 171.3 |
| SR-349 (grams) | 33.3 |
| TPO (grams) | 0.9 |
| Irganox 1035 (grams) | 0.4 |
| Irgacure 184 (grams) | 1.7 |
| CPI 6976 (grams) | 0.1 |
| Properties |  |
| Tensile Strength (MPa) | 64.4 |
| Elongation (%) | 45.6 |
| Modulus (MPa) | 1775 |
| Toughness (J/cm$^3$) | 24.0 |
| Viscosity @ 60° C. (cPs)* | 3500 |

*Determined before cure and after adding the SR-349 but before adding the TPO, Irganox 1035, Irgacure 184, and CPI 6976.

Test Methods:

Tensile Strength, Modulus, Elongation, Toughness

The tensile properties (tensile strength, percent elongation at break, and modulus) of cured samples were determined using an Instron model 4201 universal testing instrument. Samples were prepared by first drawing the liquid coating up into a 0.03 inch inner diameter silicone tubing. Once all air bubbles had escaped, the material was cured using a Fusion UV lamp at 1.0 Joule/cm$^2$. The silicone tubing was then peeled away from the samples and cut into approximately 5 inch lengths. Each sample was then tested using the mentioned Instron apparatus. A 20-lb load cell was used in the Instron and modulus was calculated at 2.5% elongation from the secant at that point. The toughness (in J/cm$^3$) was calculated as the area underneath the stress/strain curve.

For testing specimens, the gage length was 2-inches and the crosshead speed was 1.00 inches/minute. All testing was done at a temperature of 23±1° C. and a relative humidity of 50±5%. All measurements were determined from the average of at least 6 test specimens.

Viscosity

The viscosity was measured using a Physica MC10 Viscometer. The instrument was set up for the conventional Z3 system, which was used. The samples were loaded into a disposable aluminum cup by using the syringe to measure out 17 cc. The sample in the cup was examined and if it contained an excessive amount of bubbles, they were removed by a direct means such as centrifugation, or enough time was allowed to elapse to let the bubbles escape from the bulk of the liquid.

The bob was gently lowered into the liquid in the measuring cup, and the cup and bob were installed in the instrument. The sample temperature was allowed to equilibrate with the temperature of the circulating liquid by waiting five minutes. Then, the rotational speed was set to a desired value to produce the desired shear rate. The shear rate was typically 50-100 sec$^{-1}$.

If the viscosity value varied only slightly (less than 2% relative variation) for 15 seconds, the measurement was complete. If not, the temperature may not yet have reached an equilibrium value, or the material may have been changing due to shearing. In the latter case, further testing at different shear rates was needed to define the sample's viscous properties. The results reported were the average viscosity values of three test samples.

Acid Value (AV)

The acid value of a material was measured using a potentiometric titration technique. In this test, a known weight of the sample was dissolved in approximately 80 mL of toluene. This solution was titrated to a potentiometric endpoint using standardized 0.1N potassium hydroxide in methanol. The acid value was calculated using equation (1):

$$AV=(V\times N\times 56.1)/W \quad (1)$$

AV=acid value in mg KOH/g
V=volume of titrant at the equivalence point
N=normality of the KOH titrant solution
W=weight of sample in grams For samples with acid values below about 0.5 mg KOH/g, 0.01 N KOH in methanol was used as the titrant.

Hydrolytic Stability

The hydrolytic stability of the polyester polyols was determined by mixing 3:1 wt/wt polyester polyol/ENPA mixtures with distilled water (weight ratio polyol/ENPA mixture to water being 4:1). The thus obtained mixture was subjected to 100° C. for four hours (under reflux). After the four hour period, the reflux column (condenser) was removed and the temperature was raised to 150° C. for two hours to drive of the water. After this treatment, the acid value of the mixture was determined according to acid value test method described above. The acid value of the polyester polyol was then determined by multiplying the acid value of the mixture by 1.33 (i.e. correcting for the presence of 25% ENPA). The difference between the thus obtained acid value of the polyester polyol and the initial acid value of the polyester polyol (i.e. prior to treatment with water at elevated temperatures) is considered a measure for hydrolytic stability (the higher the rise in acid value, the poorer the hydrolytic stability).

Hydroxyl Number

The hydroxy number of a material was measured using a potentiometric titration technique. In this test, a known weight of the sample was dissolved in approximately 80 mL of toluene. The sample, after being completely dissolved, was treated with 5 mL of acetylating solution; said solution comprising:

1) 85 mL toluene
2) 15 mL acetic anhydride
3) 1.0 g DMAP (dimethyl amino pyridine)

The treated sample was then placed in an oven set to 60° C. for 15 minutes. After the heating was completed, each sample was further treated with 20 mL dibutylamine solution comprising of:

1) 500 mL toluene
2) 40 mL n-dibutylamine

Finally, the samples were titrated to an endpoint using 0.5N HCL in ethanol solution (the acid solution had been previously standardized to 0.001 N accuracy using anhydrous potassium carbonate as the standard).

The final hydroxyl number was calculated as follows in equation 2:

$$OH\#=((V-b1)\times N\times 56.1)/W \quad (2)$$

OH#=hydroxy number in mg KOH/g
V=volume of titrant at the equivalence point
b1=blank=volume of titrant at the equivalence point with no sample present; previously determined
N=normality of the HCL titrant solution
W=weight of sample in grams Molecular Weight The number average molecular weight and weight average molecular weight of the polyester polyol was determined by Gel Permeation Chromatography (GPC) against styrene standards. The polydispersity of the polyester polyol was then calculated by dividing the weight average molecular weight by the number average molecular weight.

Having described specific embodiments of the present invention, it will be understood that many modifications thereof will readily be apparent to those skilled in the art, and it is intended therefore that this invention is limited only by the spirit and scope of the following claims.

What is claimed is:

1. An oligomer comprising
   (1) a backbone comprising a polyester, said polyester being prepared by reacting at least the following reactants:
      (a) one or more polyalkylesters;
      (b) one or more polyols; and
      (c) optionally, one or more components selected from the group consisting of polycarboxylic acids, polycarboxylic anhydrides, and hydroxyl-functional monocarboxylic acids;
   (2) one or more curable groups attached to said backbone;
   wherein said polyester has a number average molecular weight below 5,000 g/mol, wherein
   at least 50 wt % of said reactants is said one or more polyalkylesters, said 50 wt % being relative to the combined weight of said polycarboxylic acids, said polycarboxylic acid anhydrides, said hydroxy-functional monocarboxylic acids, and said polyalkylesters, and wherein
   said composition, after cure, exhibits a tensile modulus of at least 1000 MPa and an elongation at break of at least 40% at 23° C.

2. The oligomer according to claim 1, wherein said one or more polyalkylesters include an aromatic ring.

3. The oligomer according to claim 1, wherein said one or more polyalkylesters include a polyalkylester having two or more groups represented by the following formula (1)

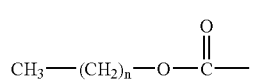

wherein n is 0 or 1.

4. The oligomer according to claim 1, wherein said one or more polyols include a $C_1$-$C_8$ polyol.

5. The oligomer according to claim 1, wherein said one or more polyalkylesters include dimethyl terephthalate.

6. The oligomer according to claim 1, wherein said one or more polyalkylesters is dimethyl terephthalate.

7. The oligomer according to claim 1, wherein said one or more polyols includes diethylene glycol.

8. The oligomer according to claim 1, wherein said one or more polyols includes propylene glycol.

9. The oligomer according to claim 1, wherein said one or more curable groups include one or more (meth)acrylate groups.

10. The oligomer according to claim 9, wherein said one or more curable groups are attached to said backbone via urethane groups.

11. The oligomer according to claim 1, wherein said oligomer is a polyester urethane diacrylate.

12. The oligomer according claim 1, wherein said polyester is prepared by reacting
(a) at least 90 wt %, relative to the combined weight of components (a) and (c), of said polyalkylesters,
(b) said one or more polyols, and
(c) 0-10 wt %, relative to the combined weight of components (a) and (c), of said one or more components selected from the group consisting of polycarboxylic acids, polycarboxylic anhydrides, and hydroxy-functional monocarboxylic acids.

13. The oligomer according to claim 1, wherein said backbone further comprises a polymeric unit other than said polyester.

14. The oligomer according to claim 1, wherein said number average molecular weight is in the range of 500-1500 g/mol.

15. The oligomer according to claim 1, wherein said polyester has a viscosity such that the viscosity of a 3:1 (wt/wt) mixture of the polyester with ethoxylated (4) nonylphenol acrylate is below 2500 cPs at 60° C.

16. The oligomer according to claim 15, wherein said viscosity is at least 500 cPs.

17. The oligomer according to claim 1, wherein said polyester has an acid number rise of less than 3.0.

18. A composition comprising the oligomer according to claim 1.

19. The composition of claim 18, further comprising a reactive diluent.

20. A process comprising coating a substrate with the composition according to claim 18.

21. The process of claim 20, wherein said substrate is an optical fiber.

22. A coated optical fiber comprising:
(a) an optical fiber; and
(b) one or more coatings surrounding said fiber;
wherein at least one of said one or more coatings is obtained by curing a composition according to claim 18.

23. A process for making a polyester urethane (meth) acrylate oligomer, comprising:
(1) preparing an oligomeric polyester polyol by reacting
(a) one or more polyalkylesters; with
(b) one or more polyols; and
(2) reacting said oligomeric polyester polyol with
(c) one or more polyisocyanates; and
(d) one or more hydroxyfunctional (meth)acrylates, wherein at least 50 wt % of reactants is said one or more polyalkylesters, and wherein
said composition, after cure, exhibits a tensile modulus of at least 1000 MPa and an elongation at break of at least 40% at 23° C.

* * * * *